United States Patent
Sonntag

(10) Patent No.: US 8,955,047 B2
(45) Date of Patent: Feb. 10, 2015

(54) METHOD CLIENT AND SYSTEM FOR AUTHENTICATION OF A LOW-SECURITY CLIENT AND A HIGH-SECURITY CLIENT IN A MOBILE RADIO NETWORK

(75) Inventor: Thomas Sonntag, Wachtberg (DE)

(73) Assignee: Deutsche Telekom AG, Bonn (DE)

( * ) Notice: Subject to any disclaimer, the term of this patent is extended or adjusted under 35 U.S.C. 154(b) by 61 days.

(21) Appl. No.: 13/391,861

(22) PCT Filed: Aug. 20, 2010

(86) PCT No.: PCT/EP2010/005127
§ 371 (c)(1),
(2), (4) Date: Feb. 23, 2012

(87) PCT Pub. No.: WO2011/023338
PCT Pub. Date: Mar. 3, 2011

(65) Prior Publication Data
US 2012/0167177 A1   Jun. 28, 2012

Related U.S. Application Data

(60) Provisional application No. 61/236,715, filed on Aug. 25, 2009.

(30) Foreign Application Priority Data

Aug. 25, 2009   (EP) .................................... 09010852

(51) Int. Cl.
*G06F 21/00* (2013.01)
*H04L 29/06* (2006.01)
(Continued)

(52) U.S. Cl.
CPC .............. *H04W 12/06* (2013.01); *H04W 84/12* (2013.01); *H04L 63/08* (2013.01); *H04L 69/24* (2013.01); *H04L 69/28* (2013.01)
USPC .............. 726/3; 726/2; 726/4; 726/5; 726/26; 726/27; 726/28; 726/29; 726/30; 713/166; 713/167; 713/168; 713/169

(58) Field of Classification Search
USPC ...................... 726/26–30, 2–5; 713/166–169
See application file for complete search history.

(56) References Cited

U.S. PATENT DOCUMENTS 5,930,242 A * 7/1999 Mimura ....................... 370/331
6,934,531 B1   8/2005 Hake et al.
(Continued)

FOREIGN PATENT DOCUMENTS

EP            0869692 A1   10/1998
EP            1112666 B1    4/2007
(Continued)

OTHER PUBLICATIONS

Crevatin M, et al.: "Security for Industrial Communication Systems", Proceedings of the IEEE, IEEE. New York, US, vol. 93, Nr:6, pp. 1152-1177, Jun. 2005.
(Continued)

*Primary Examiner* — Josnel Jeudy
(74) *Attorney, Agent, or Firm* — Leydig, Voit & Mayer, Ltd.

(57) ABSTRACT

A method for authentication of a high-security client and a low-security client in a high-security mobile radio network includes: transmitting a request for authentication from a base station to the high-security client, wherein the request for authentication comprises a random number as a challenge; receiving a response from the high-security client at the base station, wherein the response from the high-security client comprises a generated number generated by performing a keyed cryptographic function on the challenge; providing a fixed number to the low-security client; and receiving a response from the low-security client at the base station, wherein the response from the low-security client comprises the fixed number. Limited access to the mobile radio network is granted for the low-security client relative to an access of the high-security client.

9 Claims, 5 Drawing Sheets

(51) Int. Cl.
*H04W 12/06* (2009.01)
*H04W 84/12* (2009.01)

(56) References Cited

U.S. PATENT DOCUMENTS

| | | | |
|---|---|---|---|
| 8,046,581 B2* | 10/2011 | Netanel | 713/168 |
| 2005/0172117 A1* | 8/2005 | Aura | 713/155 |
| 2006/0253703 A1* | 11/2006 | Eronen et al. | 713/156 |
| 2008/0127311 A1* | 5/2008 | Yasaki et al. | 726/4 |
| 2009/0164288 A1* | 6/2009 | Kojima | 705/8 |
| 2010/0027522 A1* | 2/2010 | Mukai et al. | 370/338 |

FOREIGN PATENT DOCUMENTS

| | | | |
|---|---|---|---|
| WO | WO 2006059195 | A1 | 6/2006 |
| WO | WO 2007093216 | * | 8/2007 |

OTHER PUBLICATIONS

Piètre-Cambacédès L, et al.: "Cryptographic Key Management for SCADA Systems-Issues and Perspectives", Information Security and Assurance, 2008. ISA 2008. International Conference on, IEEE, Piscataway, NJ, USA, pp. 156-161, Apr. 2008.

European Patent Office, International Search Report in International Patent Application No. PCT/EP2010/005127 (Nov. 29, 2010).

* cited by examiner

METHOD CLIENT AND SYSTEM FOR AUTHENTICATION OF A LOW-SECURITY CLIENT AND A HIGH-SECURITY CLIENT IN A MOBILE RADIO NETWORK

CROSS-REFERENCE TO RELATED APPLICATIONS

This patent application is a national stage entry under 35 U.S.C. §371 of International Application No. PCT/EP2010/005127, filed Aug. 20, 2010, and claims priority to European Patent Application No. EP09010852.3, filed Aug. 25, 2009, and U.S. Provisional Patent Application No. 61/236,715, filed Aug. 25, 2009. The International Application was published in English on Mar. 3, 2011, as WO 2011/023338 A1.

FIELD

The present invention relates to a method, a low security client and a system for authentication of the low-security client in a high-security network by using a simplified alternative of a challenge and response method for authentication.

BACKGROUND

The high security achieved by using challenge and response methods and subscriber identity modules (SIM) for authentication of a high-security client in a mobile radio network goes along with high costs for development, production, personalization, administration and logistics of SIM Cards. For market segments in which the transmitted data volume amounts to only less than, e.g., ten kilobytes per client per year so that the volume of sales is very low compared to the costs for high security authentication, it is useful to pass on high security and accept a lower security for low-volume clients that only use a small data volume or have otherwise restricted or limited access. This is the case regarding low-volume clients used for machine-to-machine connections, e.g., an electric meter.

European Patent EP 1112666 B1 describes a method for improving the security of authentication procedures in digital mobile radio networks. The mobile radio network determines, by means of special algorithms and a SIM-specific secret code Ki, from a random number (as a challenge) an authentication result and a temporary code KC. If the high-security client wishes to log in, the mobile radio network transmits the random number to the subscriber identity module (SIM). The SIM determines, by means of the same, special algorithm and its SIM-specific secret code Ki, an associated authentication result and transmits the authentication result back to the mobile radio network (as a response). The mobile radio network compares the received authentication result to the stored authentication result for agreement, and in the case of agreement the high-security client is considered authenticated. The code KC calculated on both ends is used on both ends for decoding the transmission.

A drawback of the method mentioned above is that it goes along with high costs for development, production, personalization, administration and logistics of SIM Cards compared to the transmitted data volume that amounts to only some kilobytes per client per year.

SUMMARY

In an embodiment, the present invention provides a method for authentication of a high-security client and a low-security client in a high-security mobile radio network. The method includes: transmitting a request for authentication from a base station to the high-security client, wherein the request for authentication comprises a random number as a challenge; receiving a response from the high-security client at the base station, wherein the response from the high-security client comprises a generated number generated by performing a keyed cryptographic function on the challenge; providing a fixed number to the low-security client; and receiving a response from the low-security client at the base station, wherein the response from the low-security client comprises the fixed number. A limited access to the mobile radio network is granted for the low-security client relative to an access of the high-security client.

DETAILED DESCRIPTION

Figure 1:
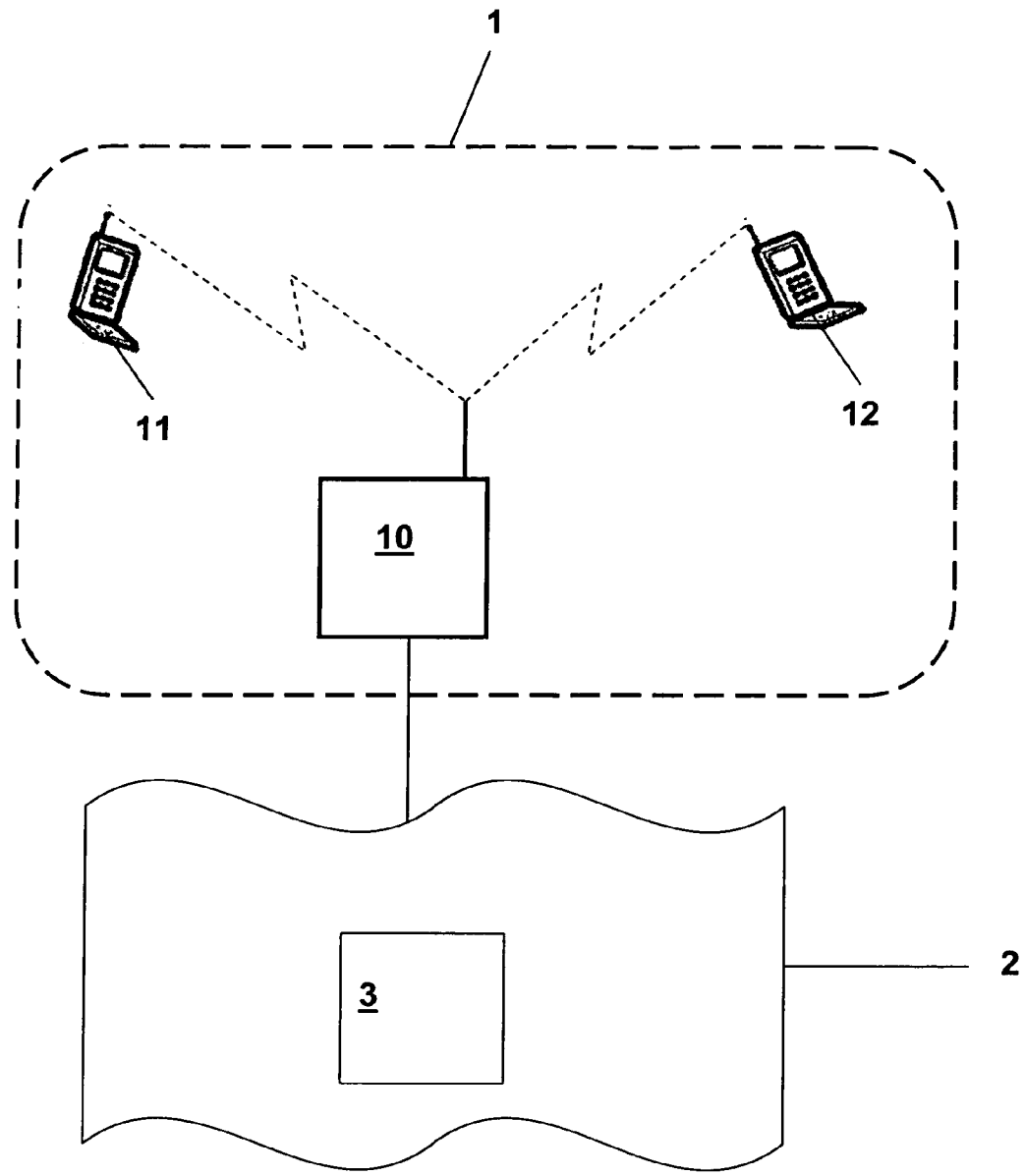
FIG. 1 shows schematically a cell of a mobile radio network.

In embodiments of the present invention, a method, a low-security client and a system are provided for authentication of the low-security client in a high-security network by using a simplified alternative of a challenge and response method for authentication.

In an embodiment, a high security network is a network that requires the following steps for authentication of a high-security client: a first step and a second step, wherein the first step includes transmission of a request for authentication from a base station to the high-security client, wherein the request for authentication includes a random number as a challenge, wherein the second step includes a first response from the high-security client to the base station, wherein the first response includes a generated number generated by performing a keyed cryptographic function on the challenge, Authentication of a low-security client includes a third step including a fixed number being provided to the low-security client and a fourth step including a second response from the low-security client to the base station, wherein the second response includes the fixed number.

In an embodiment, a method is provided for authentication, in a mobile radio network, of a high-security client and the low-security client, wherein the mobile radio network is a high-security network, wherein authentication of the high-security client includes a first step and a second step, wherein the first step includes transmission of a request for authentication from a base station to the high-security client, wherein the request for authentication includes a random number as a challenge, wherein the second step includes a first response from the high-security client to the base station, wherein the first response includes a generated number generated by performing a keyed cryptographic function on the challenge, wherein authentication of the low-security client includes a third step including a fixed number being provided to the low-security client and a fourth step including a second response from the low-security client to the base station, wherein the second response includes the fixed number, wherein for the low-security client limited access to the mobile radio network is granted, compared to access of the high-security client.

It is thereby advantageously possible to authenticate the low-security client in a high security network without changing the interfaces between the low-security client and the network. Thus, it is possible to provide existing services in parallel operation with respect to the low-security client and the high-security client. For example, such a parallel operation is possible for low-security clients used for metering electricity, gas or water.

In the context of the present disclosure, the term "fixed number" means any data or information, whether in numeric and/or alphanumeric and/or in string form.

In an embodiment, the fixed number is used to authenticate the low-security client for at least one subsequent authentication and preferably for each subsequent authentication of the low-security client.

It is thereby advantageously possible to use the fixed number for a large number of authentications. Therefore authentication of the low security client is simpler and cheaper than authentication of the high-security client.

In an embodiment, for the low-security client, limited access to the mobile radio network is granted compared to access of the high-security client. The limited access to the mobile radio network of the low-security client can be realized such that the low-security client does not have voice access and/or that the low-security client does not have a roaming possibility.

It is thereby advantageously possible to limit the data volume used by a low-security client. Thus, the network utilization by low-security clients is limitable. Regarding the fact that unauthorized network utilization of the low-security access is more easily possible compared to the high-security access, the limitation of the access of the low security clients (e.g., limited data volume) limits the data volume transmitted by unauthorized network utilization and therefore the costs of misuse are limited. Furthermore it is advantageously possible by limiting the low-security access, e.g., by limiting the data volume or the number of low-security accesses in a predetermined time, to minimize the impairment of the high-security access.

In an embodiment, the limited access includes a time limit or a data transfer volume limit.

It is thereby advantageously possible to limit the network resources used by a low-security client. For example the low-security access is limitable to less than 1 MB of transmitted data volume per year, less than 100 KB of transmitted data volume per year, less than 10 KB of transmitted data volume per year, or less than 1 KB of transmitted data volume per year.

In an embodiment, a first client identification code is transmitted by the high-security client to the base station and a second client identification code is transmitted by the low-security client to the base station, wherein the second client identification code is transmitted before the second response is transmitted. Preferably, the first client identification code is the (International Mobile Subscriber Identification) IMSI information of the high security client and the second client identification code is the IMSI information of the low security client.

It is thereby advantageously possible to identify a low-security client if the second identification code is assigned to the fixed number.

In an embodiment, the second client identification code is transmitted substantially at the same time as the second response.

It is thereby advantageously possible to identify the low-security client and receive the fixed number in only one step.

The invention further relates to a low-security client for authentication in a mobile radio network, the mobile radio network including a high-security client and the low-security client, wherein the mobile radio network is a high-security network, wherein authentication of the high-security client includes a transmission of a request for authentication from a base station to the high-security client, wherein the request for authentication includes a random number as a challenge, wherein authentication of the high-security client includes a first response transmitted from the high-security client to the base station, wherein the first response includes a generated number generated by performing a keyed cryptographic function on the challenge, wherein authentication of the low-security client includes a fixed number provided to the low-security client and a second response transmitted from the low-security client to the base station, wherein the second response includes the fixed number, wherein the low-security client includes a second identification code and the fixed number, wherein for the low-security client a limited access to the mobile radio network is granted, compared to an access of the high-security client.

It is thereby advantageously possible to reduce costs for the low-security client compared to the high-security client.

The invention further relates to a system for authentication, in a mobile radio network, of a high-security client and a low-security client, wherein the mobile radio network is a high-security network, wherein authentication of the high-security client includes a transmission of a request for authentication from a base station to the high-security client, wherein the request for authentication includes a random number as a challenge, wherein authentication of the high-security client includes a first response transmitted from the high-security client to the base station, wherein the first response includes a generated number generated by performing a keyed cryptographic function on the challenge, wherein authentication of the low-security client includes a fixed number provided to the low-security client and a second response transmitted from the low-security client to the base station, wherein the second response includes the fixed number, wherein the low-security client includes a second identification code, wherein the system includes a database, wherein in the database the second identification code and the fixed number are assigned to each other wherein for the low-security client a limited access to the mobile radio network is granted, compared to an access of the high-security client.

In an embodiment, the system includes the low-security client with a memory unit, wherein the fixed number is stored in the memory unit, wherein the fixed number is preferably encrypted in the memory unit.

In an embodiment, the challenge can be stored permanently in the database.

These and other characteristics, features and advantages of the present invention will become apparent from the following detailed description, taken in conjunction with the accompanying drawings, which illustrate, by way of example, the principles of the invention. The description is given for sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

FIG. 1 shows schematically a cell 1 of a cellular mobile radio network. The cellular mobile radio network includes a core network 2 with a database 3 and a multitude of base stations, one thereof, a base station 10, is connected to a high-security client 11 and a low-security client 12. FIG. 1 shows the possibility of providing existing services in parallel operation to the low-security client 12 and the high-security client 11 without changing the interfaces between the low-security client 12 and the network.

In an exemplary embodiment, the low-security client 12 is limitable to less than 1 MB of transmitted data volume per year, less than 100 KB of transmitted data volume per year, less than 10 KB of transmitted data volume per year, or less than 1 KB of transmitted data volume per year. Thus, network utilization by the low-security client 12 is limitable and the service for the high-security clients 11 is not affected.

In an exemplary embodiment, the low-security client 12 is also limitable to transmit data only in certain time intervals, especially in times of low network utilization or in predetermined time slots. Furthermore, there is a first possibility where the base station 10 defines the beginning and the length of a time slot in which the low-security client 12 can have access to the mobile radio network. Furthermore, there is a second possibility where the low-security client 12 defines the beginning and the length of a time slot in which the low-security client 12 can have access to the mobile radio network. The first possibility includes two alternatives. First, the base station 10 requests a data transfer from the low-security client 12 for example once a day, once a month, or once a year. Second, the base station 10 informs the low-security client 12 about the beginning and the length of time slots, in which the low-security client 12 can have access to the mobile radio network. For example, only once a day a time slot is opened, or only once a week, once a month, or once a year. The second possibility includes two alternatives. First, the low-security client 12 transmits data only in predetermined time slots stored in the low-security client 12. The beginning and length of such predetermined time slots are preconfigured in the low-security client 12 or transmitted by the core network 2. For example, such predetermined time slots are scheduled once a day, only once a week, only once a month, or once a year. Second, the low-security client 12 sends a request for a low-security access to the base station 10. Advantageously, the low-security client 12 sends a request for a low-security access for example once a day, once a week, once a month, or once a year.

In an exemplary embodiment, the low-security client 12 advantageously transmits data using SMS (Short Message Service). In this case, the access is, e.g., limitable to less than 80 short messages per year, less than 20 short messages per year, less than 10 short messages per year, or only one short message per year.

In exemplary embodiments, the low security client 12 is realized in two different hardware configurations. The first configuration is that the low-security client 12 includes a metering device, e.g., a meter of electricity or water or gas. The second configuration is that the low-security client 12 does not include a metering device but is assigned to at least, e.g., one meter of gas or electricity or water.

Regarding the low-security client 12 and the low-security access, a plurality of combinations of the limitation alternatives is possible, e.g., it is possible that the low-security client 12 is predetermined to one time slot per month, wherein the low-security client 12 can transmit 10 KB of data volume in such a time slot. Other combinations of a time limitation and a volume limitation are also possible.

Figure 2:
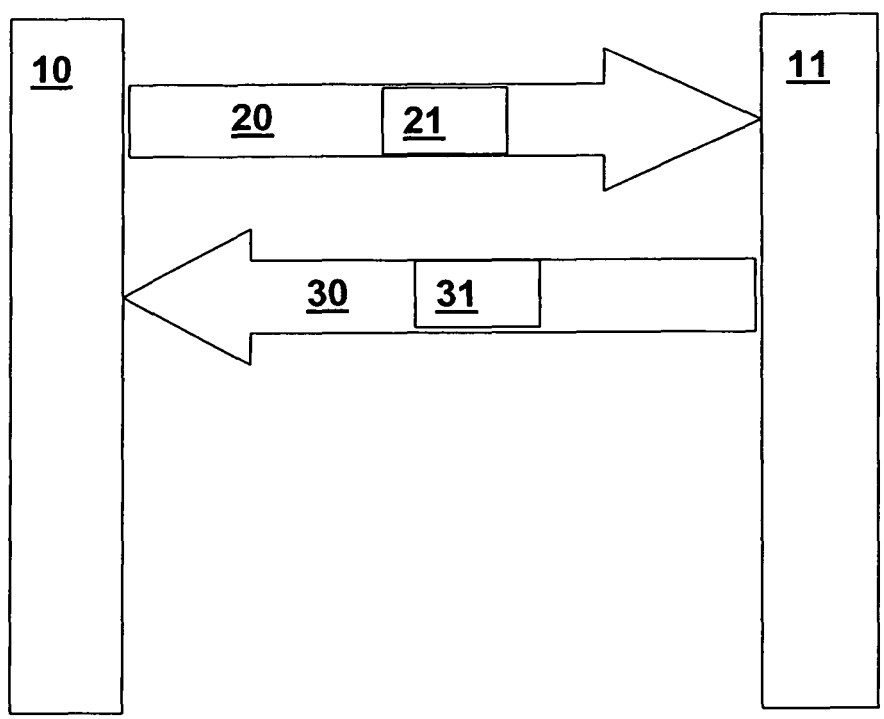
FIG. 2 shows schematically an exchange of information between a base station and a high-security client.

FIG. 2 shows the steps of authentication of the high-security client 11, wherein authentication of the high-security client 11 includes a first step and a second step, wherein the first step includes transmission of a request for authentication 20 from the base station 10 to the high-security client 11, wherein the request for authentication 20 includes a random number 21 as a challenge, wherein the second step includes a first response 30 from the high-security client 11 to the base station 10, wherein the first response 30 includes a generated number 31 generated by performing a keyed cryptographic function on the challenge. FIG. 2 shows the steps of authentication of a normal client (a high-security client 11) of a known mobile radio network. In an exemplary embodiment, the low-security client 12 uses the mobile radio network at the same time as the high-security client 11.

Figure 3:
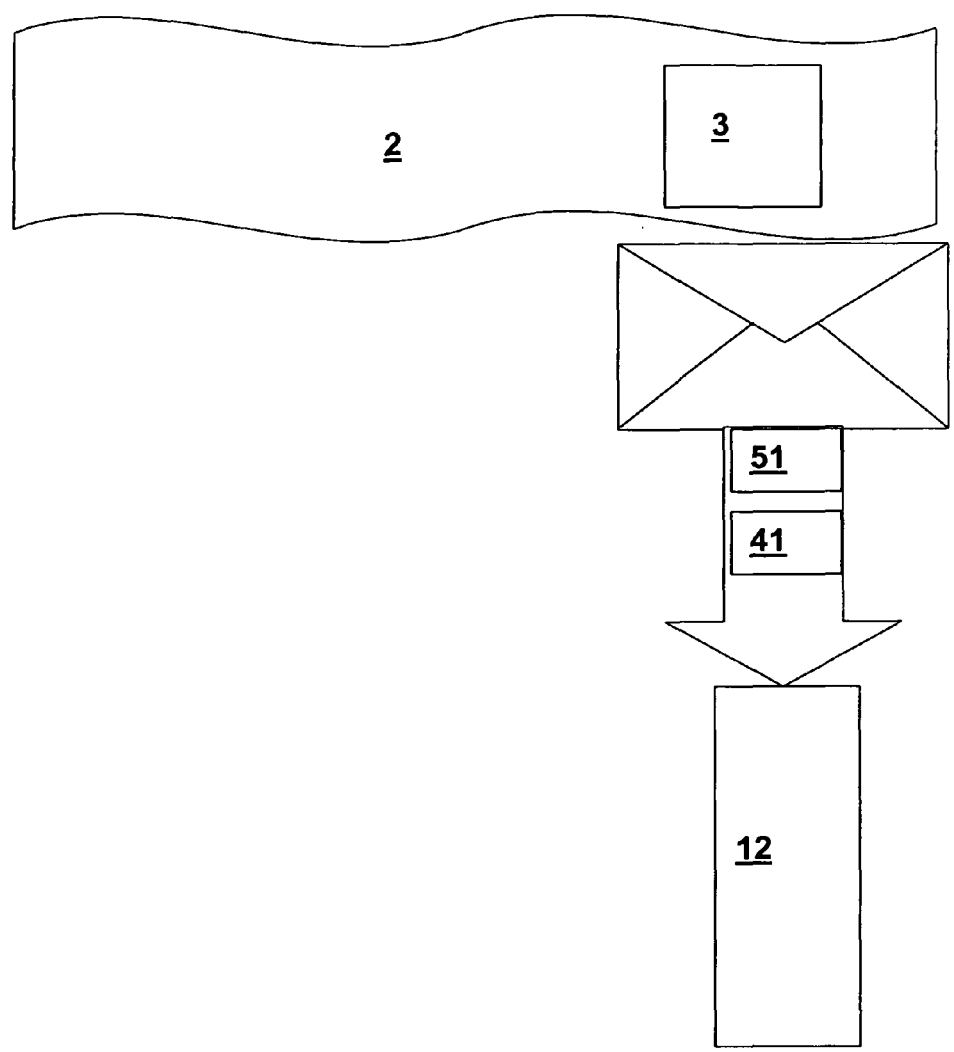
FIG. 3 shows schematically exchanges of information between a core network and a low-security client and between the core network and the base station according to an embodiment of the present invention.

FIG. 3 shows a third step of authentication of the low-security client 12, wherein in the third step the core network 2 provides a second client identification code 51 and a fixed number 41, both stored in a database 3, to the low-security client 12. The second client identification code 51 and the fixed number 41 are providable to the low-security client 12, e.g., per mail or email or internet or short message. Advantageously the second client identification code 51 is providable to the low-security client 12 a short time—compared to the high-security client 11—before the usage of the low-security client 12 in the mobile radio network begins, so that changes of the second client identification code 51 are easily and cheaply possible. Moreover the second client identification code 51 is storable in the database 3 a short time—compared to the high-security client 11—before the usage of the low-security client 12 in the mobile radio network begins, so that the costs for memory space in the database 3 are limitable compared to the high-security client 11. Furthermore the network provider is changeable without changing hardware, especially without changing a SIM card. It is also advantageous that the fixed number 41 and/or the second client identification code 51 is definable a long time, e.g. months or years, before the usage of the low-security client in the mobile radio network begins. This leads to the advantage that the fixed number 41 and/or the second client identification code 51 is valid a long time, e.g. months or years, and does not need to be generated shortly before low-security access is granted (like in the high-security case). Furthermore it is possible that the fixed number 41 and/or the second client identification code 51 is provided to the low-security client 12 a long time before the usage in the network begins.

Figure 4:
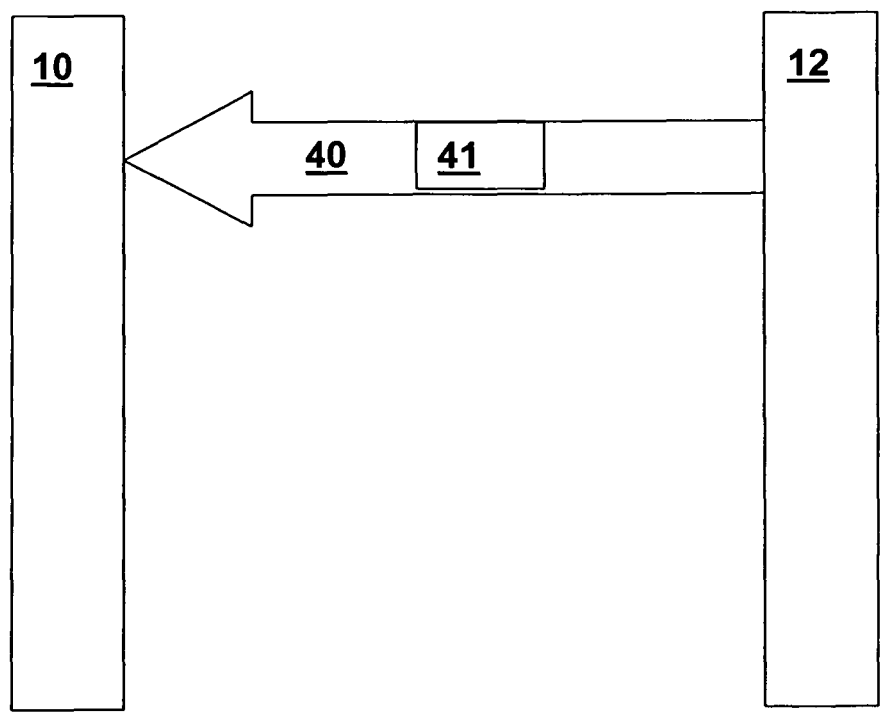
FIG. 4 shows schematically an exchange of information between the base station and the low-security client according to an embodiment of the present invention.

FIG. 4 shows a fourth step of authentication of the low-security client 12 including a second response 40 from the low-security client 12 to the base station 10, wherein the second response 40 includes the fixed number 41.

Figure 5:
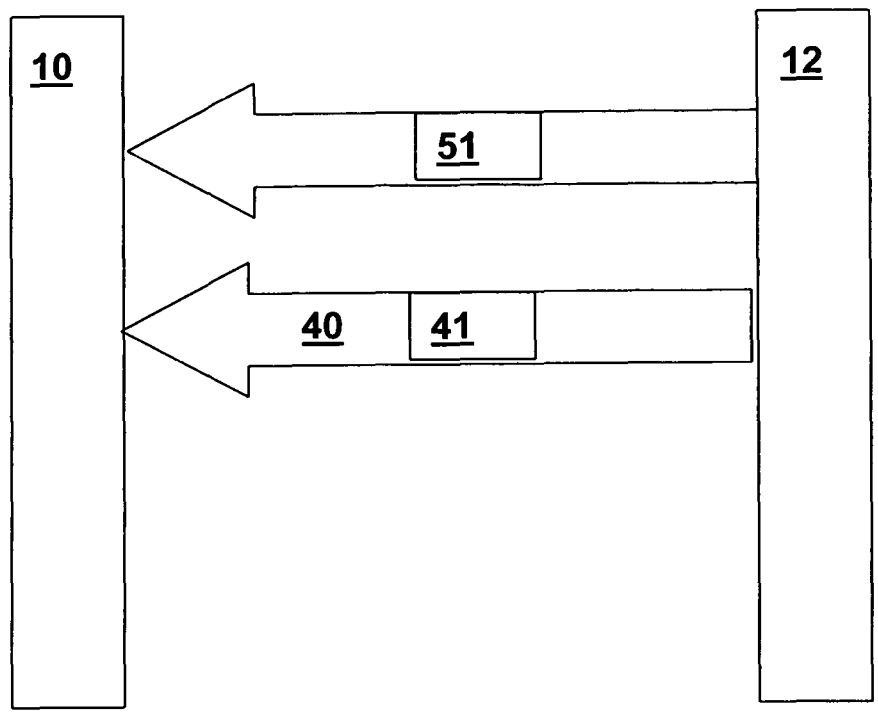
FIGS. 5 and 6 show schematically exchanges of information between the base station and the low-security client according to embodiments of the present invention.

FIG. 5 shows a second client identification code 51 being transmitted by the low-security client 12 to the base station 10, wherein the second client identification code 51 is transmitted before the second response 40 is transmitted.

Figure 6:
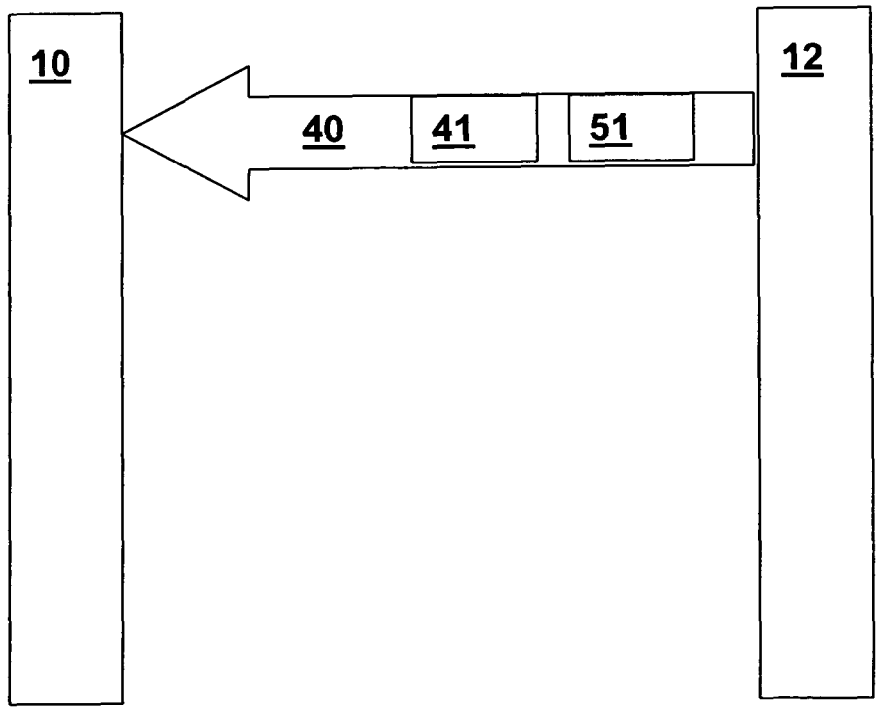

FIG. 6 shows the second client identification code 51 is transmitted substantially at the same time as the second response 40.

It is advantageously possible that a plurality of low-security clients 12 share the same second identification code 51. Thus, the number of second identification codes 51 is reducible to reduce the costs for administration of the plurality of low-security clients 12. Under these circumstances, two or more of such a plurality of low-security clients 12 should not use the low-security access at the same time. For example, in the case of a plurality of meters of gas, water or electricity sharing one low-security access, each meter transmits data at a different time.

The invention claimed is:

1. A method for authentication of a high-security client and a low-security client in a high-security mobile radio network, the method comprising:
   authenticating the high-security client, comprising:
      transmitting a request for authentication from a base station to the high-security client, wherein the request for authentication comprises a random number as a challenge; and
      receiving a response from the high-security client at the base station, wherein the response from the high-security client comprises a generated number generated by performing a keyed cryptographic function on the challenge; and
   authenticating the low-security client, comprising:
      providing a fixed number to the low-security client; and
      receiving a response from the low-security client at the base station, wherein the response from the low-security client comprises the fixed number;
   wherein a limited access to the mobile radio network is granted for the low-security client relative to an access of the high-security client, wherein the high-security client includes a Subscriber Identity Module (SIM) card and authentication of the high-security client involves the SIM card, and wherein authentication of the low-security client does not involve a SIM card, such that a network provider for the low-security client is changeable to the high-security mobile radio network without changing a SIM card.

2. The method according to claim 1, further comprising:
   performing subsequent authentications of the high-security client, wherein in each subsequent authentication, another generated number is generated that differs from the generated number; and
   performing at least one subsequent authentication of the low-security client using the fixed number.

3. The method according to claim 1, wherein the limited access of the low-security client is limited with respect to a time limit or a data transfer volume limit.

4. The method according to claim 1, wherein a first client identification code is received by the base station from the high-security client and a second client identification code is received by the base station from the low-security client, and wherein the second client identification code is received before the response from the low-security client.

5. The method according to claim 1, wherein a first client identification code is received by the base station from the high-security client and a second client identification code is received by the base station from the low-security client.

6. A low-security client in a high-security mobile radio network comprising a tangible, non-transitory computer-readable medium having computer-executable instructions stored thereon for authentication of the low-security client in the high-security mobile radio network, the computer-executable instructions when executed by a processor causing the low-security client to perform the steps of:
   receiving a fixed number at the low-security client; and
   transmitting a response from the low-security client to a base station of the high-security mobile radio network for authentication of the low-security client, wherein the response from the low-security client comprises the fixed number;
   wherein a limited access to the mobile radio network is granted for the low-security client relative to an access of a high-security client authenticated by the high-security mobile radio network based on a generated number generated by performing a keyed cryptographic function on a challenge sent from the base station to the high-security client, wherein the high-security client includes a Subscriber Identity Module (SIM) card and authentication of the high-security client by the high-security mobile radio network involves the SIM card, and wherein authentication of the low-security client by the high-security mobile radio network does not involve a SIM card, such that a network provider for the low-security client is changeable to the high-security mobile radio network without changing a SIM card.

7. A system for authentication of a high-security client and a low-security client in a high-security mobile radio network, comprising:
   a base station, configured to transmit a request for authentication to the high-security client, wherein the request for authentication comprises a random number as a challenge;
   the high-security client, configured to transmit a first response to the base station, wherein the first response comprises a generated number generated by performing a keyed cryptographic function on the challenge;
   the low-security client, configured to receive a fixed number and to transmit a second response to the base station for authentication of the low-security client, wherein the second response comprises the fixed number and the low-security client comprises an identification code; and
   a database, the identification code and the fixed number being assigned to each other therein;
   wherein a limited access to the mobile radio network is granted for the low-security client relative to an access of the high-security client, wherein the high-security client includes a Subscriber Identity Module (SIM) card and authentication of the high-security client involves the SIM card, and wherein authentication of the low-security client does not involve a SIM card such that a network provider for the low-security client is changeable to the high-security mobile radio network without changing a SIM card.

8. The system of claim 7, the low-security client comprises a memory unit configured to store the fixed number.

9. The system of claim 8, wherein the fixed number is encrypted in the memory unit.

* * * * *